US006206258B1

(12) United States Patent
Calder

(10) Patent No.: US 6,206,258 B1
(45) Date of Patent: Mar. 27, 2001

(54) CARRIER FOR SUNGLASSES FOR USE ON A BICYCLE

(76) Inventor: Michael J. Calder, 1681 48th Ave., San Francisco, CA (US) 94122

( * ) Notice: Subject to any disclaimer, the term of this patent is extended or adjusted under 35 U.S.C. 154(b) by 0 days.

(21) Appl. No.: 09/150,544

(22) Filed: Sep. 9, 1998

(51) Int. Cl.$^7$ ........................................................ B62J 7/06
(52) U.S. Cl. ........................ 224/420; 224/428; 224/463; 224/572; 224/251; 248/902; 24/3.3
(58) Field of Search .................... 224/242, 245, 224/249, 251, 463, 428, 432, 433, 436, 437, 440, 420, 572; 248/902, 309.1, 314, 316.7, 230.8, 229.17; 24/3.3, 3.9, 16 R, 16 PB

(56) References Cited

U.S. PATENT DOCUMENTS

| | | | |
|---|---|---|---|
| 1,756,677 | * | 4/1930 | Cook ........................................ 224/245 |
| 3,994,048 | * | 11/1976 | Rosenthal ........................... 24/16 R X |
| 4,631,783 | * | 12/1986 | Hayashi ......................... 248/309.1 X |
| 4,817,901 | * | 4/1989 | Kuo .................................... 248/230.8 |
| 4,878,641 | * | 11/1989 | Vogt ................................. 224/420 X |
| 4,932,625 | * | 6/1990 | Hotchkiss, Jr. ................... 248/316.7 |
| 4,946,125 | * | 8/1990 | McCarty ........................... 248/316.7 |
| 5,046,696 | * | 9/1991 | Lee .................................... 248/902 X |
| 5,129,617 | * | 7/1992 | MacWilliamson .................. 24/3.3 X |
| 5,135,188 | * | 8/1992 | Anderson et al. .............. 24/16 PB X |
| 5,340,074 | * | 8/1994 | Porcaro et al. ................... 248/902 X |
| 5,402,971 | * | 4/1995 | Bower ............................. 24/16 PB X |
| 5,489,051 | * | 2/1996 | Robinson ......................... 224/249 X |
| 5,577,698 | * | 11/1996 | Liu et al. ....................... 248/316.7 X |
| 5,592,244 | * | 1/1997 | Vyhmeister ...................... 248/902 X |
| 5,692,268 | * | 12/1997 | Case ................................. 224/463 X |

FOREIGN PATENT DOCUMENTS

113836 * 3/1944 (SE) ..................................... 224/245

* cited by examiner

Primary Examiner—Gregory M. Vidovich
(74) Attorney, Agent, or Firm—W. Edward Johnson

(57) ABSTRACT

A carrier for sunglasses for use with a bicycle having a handle-bar includes a holder and a connector. The connector includes a tubular member with a longitudinal gap forming a first portion thereof, a band and a tab. The band forms a second portion thereof, has a plurality of teeth and is attached to a first peripheral edge of the gap at one end. The tab has a slot and is attached to a second peripheral edge of the gap. The holder includes a basket which has an open top and an open bottom and a tongue which has a soft rubber, semi-rod shape shim. The tongue is resiliently and pivotally coupled to the basket. A pair of sunglasses which has a frame and a pair of wands with one of the wands is inserted into the open top of the basket and passing through the open bottom thereof and whereby the tongue resiliently presses the soft rubber, semi-rod shape shim against the wand thereby holding it in place. The connector conveniently and securely attaches the holder to the handle-bar for quick and easy access by the rider.

1 Claim, 1 Drawing Sheet

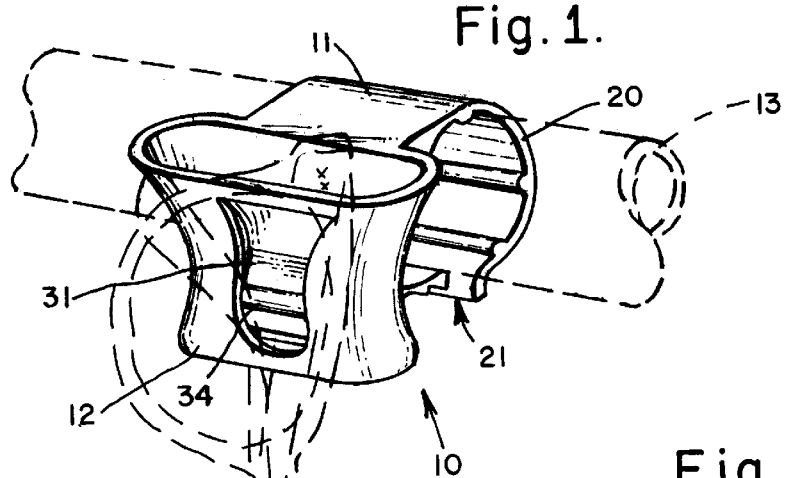
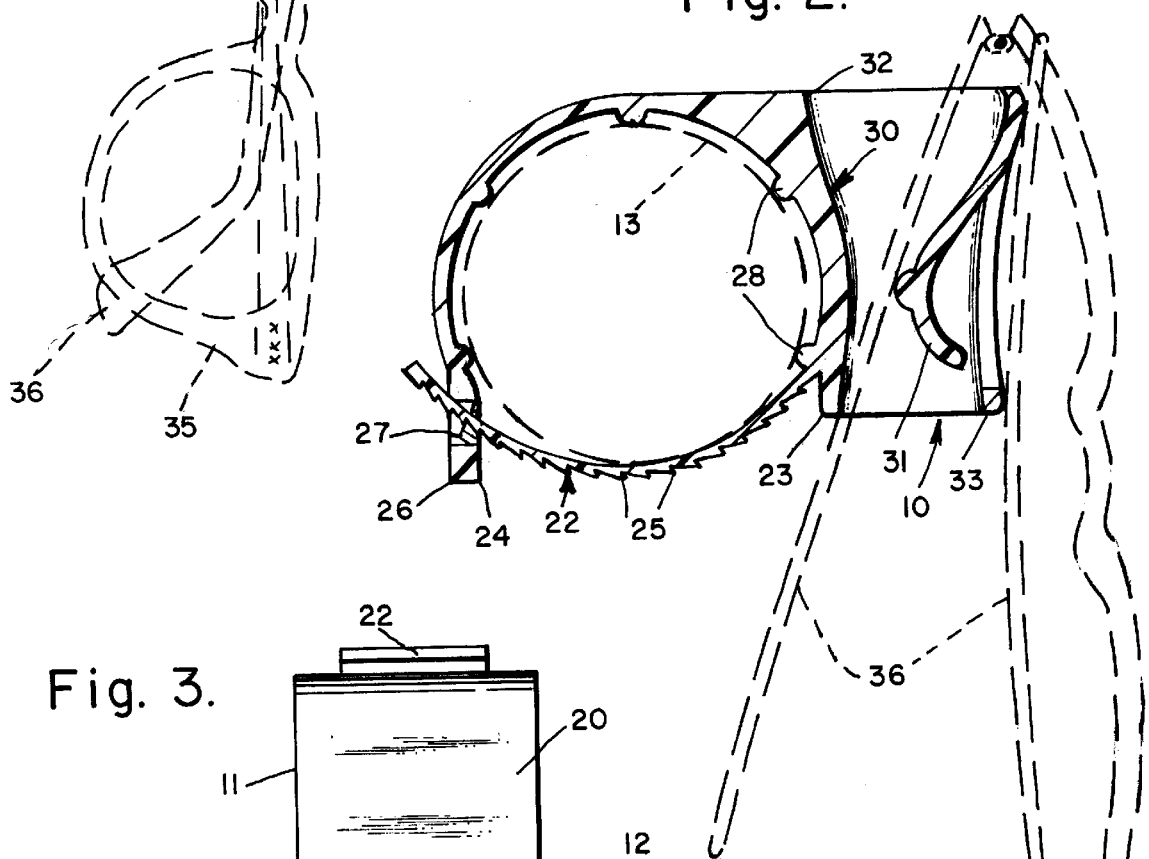
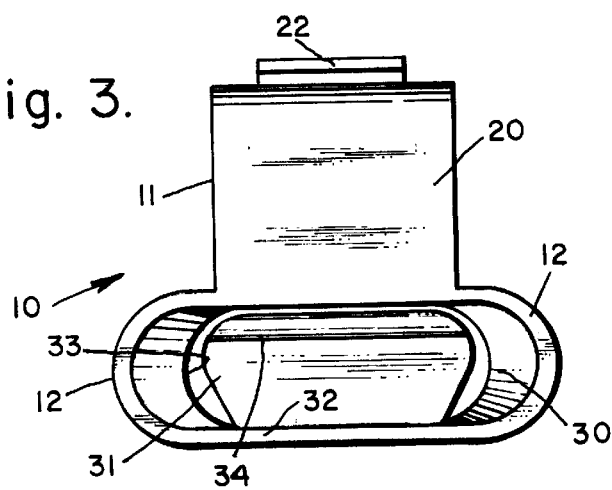

CARRIER FOR SUNGLASSES FOR USE ON A BICYCLE

BACKGROUND OF THE INVENTION

The invention relates to a carrier for sunglasses which can be conveniently attached to the handle-bar of a bicycle for quick and easy access by the rider.

Eyeglass carriers are made especially for sunglasses are in common use. There is no such carrier which is not only capable of being securely attached to a part of a bicycle, but is also ready at all times for quick and easy access by the rider to his sunglasses, while riding, without the necessity of stopping the bicycle.

U.S. Pat. No. 5,251,795 teaches a carrying case for a pair of sunglasses which has a pocket panel with broad panel walls. The pocket panel extends transversely across one of its broad panel walls and is secured thereto transversely in order to provide a side opening for the pocket so-formed externally of the carrying case. One leg of a clip-on device having a gripping loop member and a pair of legs extending from such gripping loop member is placed into the pocket. The pocket panel is interposed between the leg members, which are pressed together about the interposed pocket panel by screws to clamp the clip-on device to an operating cable of a bicycle and to hold the carrying case and any thereby carried item in place for ready access by the rider while riding. The inner surface of the loop member is preferably serrated to permit easy enlargement of such loop member by filing if and when desired. The carrying case which is capable of being securely attached to a part of a bicycle, but which is not for quick and easy access by the rider to his sunglasses, while riding, without the necessity of stopping the bicycle.

The inventor incorporates the teachings of the above-cited patent into this specification.

SUMMARY OF INVENTION

The present invention is generally directed to a carrier for sunglasses for use with a bicycle having a handle-bar includes a holder and a connector.

In a first, separate aspect of the present invention, the connector includes a tubular member with a longitudinal slot forming a first portion thereof, a band and a tab. The band forms a second portion thereof, has a plurality of teeth and is attached to a first peripheral edge of the slot at one end. The tab has a slot and is attached to a second peripheral edge of the slot. Once the tubular member is placed on the handle-bar the other end of the band is inserted into the slot of the tab and pulled tightly and securely thereon so that the slot of the tab engages one of the teeth of the band the in order to lock the band in place wherein the connector conveniently and securely attaches the holder to the handle-bar for quick and easy access by the rider.

In a second, separate aspect of the present invention the holder includes a basket which has an open top and an open bottom and a tongue which has a soft rubber, semi-rod shape shim. The tongue is resiliently and pivotally coupled to the basket. A pair of sunglasses which has a frame and a pair of wands with one of the wands is inserted into the open top of the basket and passing through the open bottom thereof. The tongue resiliently presses the soft rubber, semi-rod shape shim. The tongue is protrusion against the wand thereby holding it in place.

Other aspects and many of the attendant advantages will be more readily appreciated as the same becomes better understood by reference to the following detailed description and considered in connection with the accompanying drawing in which like reference symbols designate like parts throughout the figures.

The features of the present invention which are believed to be novel are set forth with particularity in the appended claims.

DESCRIPTION OF THE DRAWINGS

FIG. 1 is a perspective drawing of a carrier for sunglasses according to the present invention.

FIG. 2 is a side elevational view in cross-section of the carrier for sunglasses of FIG. 1.

FIG. 3 is a top plan view of the carrier for sunglasses of FIG. 1.

DESCRIPTION OF THE PREFERRED EMBODIMENTS

Referring to FIG. 1 in conjunction with FIG. 2 a carrier 10 has a connector 11 and a holder 12. A bicycle has handle-bars 13 (in phantom lines). The connector 11 includes a plastic substantially tubular member 20 as the handle-bars 13 with a longitudinal gap 21 forming a first portion thereof and a band 22 forming a second portion thereof. The longitudinal gap 21 has a first peripheral edge 23 and a second peripheral edge 24. The band 22 has a plurality of teeth 25 and is attached to the first peripheral edge 23 at one end. A tab 26 has a slot 27 and is attached to the second peripheral edge 24. A plurality of soft rubber, semi-rod shape shims 28 are longitudinally disposed on inside cylindrical surface 29. Once the plastic tubular member 20 is placed on the handle-bar 13 the other end of the band 22 is inserted into the slot 27 of the tab 26 and pulled tightly and securely thereon in order to compress the semi-rod shape shims 28 against the cylindrical surface of the plastic tubular member 20. The slot 27 of the tab 26 has a tooth which resiliently bends in one direction and which engages one of the teeth 25 of the band 22 to lock the band 22 in place. The band 22 is commonly referred to as either a zip-lock band or a cable tie. The connector 11 conveniently and securely attaches the holder 12 to a handle-bar 13 (in phantom lines) for quick and easy access by the rider.

Referring to FIG. 1 in conjunction with FIG. 2 and FIG. 3 the holder 12 includes a basket 30 and a tongue 31. The basket has an open top 32 and an open bottom 33. The tongue 31 has a soft rubber, semi-rod shape shim 34 and is resiliently and pivotally coupled to the basket 30. A pair of sunglasses has a frame 35 (in phantom lines) and a pair of wands 36 (in phantom lines). One of the wands 36 is inserted into the open top 32 of the basket 31 and passes through open bottom 33 thereof. The tongue 31 resiliently press the soft rubber, semi-rod shape shim 34 against the wand 36 thereby holding it in place. The basket 30 is so small that when not in use it is inconspicuous. The carrier 10 for sunglasses does offer much wind resistance to the rider.

From the foregoing it can be seen that a carrier for sunglasses has been described. It should be noted that the sketches are not drawn to scale and that distance of and between the figures are not tc be considered significant.

Accordingly it is intended that the foregoing disclosure and showing made in the drawing shall be considered only as an illustration of the principle of the present invention.

What is claimed is:

1. A carrier for sunglasses for use with a bicycle having a handle-bar, said carrier for sunglasses comprising:

a. a holder which includes:
   i. a basket having an open top and an open bottom; and
   ii. a tongue having a soft rubber, semi-rod shaped shim, said tongue being resiliently and pivotally coupled to said basket whereby a pair of sunglasses which has a frame and a pair of wands with one of the wands being insertable into said open top of said basket and passing through said open bottom thereof and whereby said tongue resiliently presses said soft rubber, semi-rod shaped shim against the one wand thereby holding it in place; and
b. a connector which includes:
   i. a substantially tubular plastic member with a longitudinal gap, said longitudinal gap having a first peripheral edge and a second peripheral edge;
   ii. a band forming a second portion thereof, said band having a plurality of teeth and being attached to said first peripheral edge of said longitudinal gap at one end; and
   iii. a tab having a slot, said tab being attached to said second peripheral edge of said gap whereby once said substantially tubular plastic member is placed on the handle bar the other end of said band is inserted into said slot of said tab and pulled tightly and securely thereon so that said slot of said tab engages one of said teeth of the band in order to lock said band in place whereby said connector conveniently and securely attaches said holder to the handle-bar for quick and easy access by the rider.

* * * * *